United States Patent [19]

McVey

[11] Patent Number: 4,879,504
[45] Date of Patent: Nov. 7, 1989

[54] DIGITAL SWITCHING VOLTAGE REGULATOR HAVING TELESCOPED REGULATION WINDOWS

[75] Inventor: Michael J. McVey, Manhattan Beach, Calif.

[73] Assignee: Hughes Aircraft Company, Los Angeles, Calif.

[21] Appl. No.: 244,378

[22] Filed: Sep. 15, 1988

[51] Int. Cl.[4] .............................................. G05F 1/46
[52] U.S. Cl. .................................... 323/272; 323/284; 307/64
[58] Field of Search ............... 323/271, 272, 282, 283, 323/284; 307/64, 82, 85, 87

[56] References Cited

U.S. PATENT DOCUMENTS

| | | | |
|---|---|---|---|
| 3,521,150 | 7/1970 | Bates | 323/272 |
| 3,623,140 | 11/1971 | Nercessian | 323/268 |
| 4,186,336 | 1/1980 | Weinberg et al. | 323/271 X |
| 4,520,275 | 5/1985 | Marusik | 307/85 X |
| 4,622,511 | 11/1986 | Moore | 323/272 X |
| 4,698,738 | 10/1987 | Miller et al. | 323/268 X |
| 4,766,364 | 8/1988 | Biamonte et al. | 307/82 X |

OTHER PUBLICATIONS

Fleck et al., "10 KW Solar Array Switching Unit Performance Test Results", Proceedings of 20th Intersociety Energy Conversion Engineering Conference, 1985.

Primary Examiner—Peter S. Wong
Assistant Examiner—Kristine Peckman
Attorney, Agent, or Firm—Mark J. Meltzer; Steven M. Mitchell

[57] ABSTRACT

A digital switching voltage regulator 10 for providing regulation about a single voltage despite the current supplied thereby is disclosed herein. The digital switching voltage regulator 10 of the present invention includes a first voltage regulation module 12 for regulating, within a first voltage regulation window RW1 defined by first upper and lower threshold voltages, the voltage across a load 21 operatively coupled to the regulator 10. The regulator 10 of the present invention further includes a second voltage regulation module 14 for regulating the voltage across the load 21 within a second voltage regulation window RW2 defined by second upper and lower threshold voltages. The second voltage regulation window 14 is included within the first voltage regulation window 12 and, in a preferred embodiment, the first and second regulation windows RW1 and RW2 are centered about a common voltage.

16 Claims, 5 Drawing Sheets

DIGITAL SWITCHING VOLTAGE REGULATOR HAVING TELESCOPED REGULATION WINDOWS

BACKGROUND OF THE INVENTION

1. Field of the Invention:

The present invention relates to voltage regulators. More specifically, the present invention relates to digital switching voltage regulators.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art:

Analog and digital switching voltage regulators are known in the art. In analog switching regulators the current shunted by a switch is proportional to the difference between an existing load voltage and a desired load voltage. The current shunting switch in analog regulators is typically a transistor operating in the linear mode. In certain applications the often high power consumption of analog regulators is reduced by "tapping" a power supply at less than the available supply voltage. In this manner the voltage across the transistor switch is reduced thereby reducing power consumption. However, this reduction in the transistor operating point voltage induces a corresponding reduction in the amount of power (equal to the product of tapped voltage and current) which may be shunted by the transistor prior to saturation. Hence, the regulation range of the conventional analog regulator is limited in proportion to this reduction in power handling capability.

In contrast, conventional digital regulators are typically not limited in current or power handling capability. Conventional digital switching regulators effect regulation within adjacent voltage "windows" centered about voltage setpoints sequentially offset from the desired load voltage. These digital regulators include an array of modules each including a window comparator centered about one of the setpoints. Each module typically includes a power supply (e.g., a current source) and a current shunt switch controlled by the window comparator. The array of modules is connected in parallel with the load. FIG. 1a shows a block diagram representative of a conventional digital switching regulator having a first (#1), a second (#2) and a third (#3) network connected in parallel to a bus line having a load coupled thereto. The networks #1, #2 and #3 have voltage regulation windows W1, W2, and W3 centered about setpoints Vset1, Vset2 and Vset3, respectively.

As shown in FIG. 1b, control of the bus (load) voltage is transferred between the first, second and third networks in response to variations in the bus current $I_{bus}$. Hence, a disadvantage of conventional switching voltage regulators is that the nominal bus voltage about which regulation occurs varies in response to current drawn by the bus.

Moreover, this conventional digital approach is generally expensive to implement as the switches within the networks each require an associated window comparator. Additionally, the voltages with respect to which the window comparators are referenced are typically provided by a central amplifier. Hence, failure of this central amplifier results in a complete loss of regulation capability. This risk may be unacceptable in applications such as spacecraft bus voltage regulation which require a high degree of reliability.

An alternative digital switching regulator utilizing a shift register has recently been developed which overcomes certain limitations mentioned above in connection with conventional digital switching regulators. Specifically, Fleck et al. disclose a 'voltate controlled solar array' in "10 kW Solar Array Switching Unit Performance Test Results", Proceedings of the 20th Intersociety Energy Conversion Engineering Conference, 1985. The regulator developed by Fleck includes an array of solar panels (current sources) connected to an array of shunt switches. The solar panels and shunt switches are connected in parallel with a bus and a load. When turned on, a given shunt switch diverts to ground the current from the solar panel connected thereto. Individual data registers within a shift register are operatively coupled to the shunt switches. A logic one or zero within each of the data registers turns the associated switch on or off, respectively. A comparator monitors the bus voltage and compares it with a desired reference voltage to generate a logic signal which is used to control the shift register and hence the shunt switches. Data within the shift register is updated in accordance with the logic signal in response to the application of a clock signal to the shift register. In this manner a relatively constant load current, and therefore bus voltage, is maintained by adjusting the current supplied to the bus and load in response to variations in the current drawn by the bus.

In the regulator developed by Fleck, the array of switches is controlled by a shift register and a single comparator. This implementation is generally more economical than that of the conventional digital switching regulators which have a comparator associated with each switch. However, in the regulator of Fleck both the clock signal and the logic signal generated by the comparator are continuously applied to the shift register. As a consequence, at least one bit within the shift register will change with each clock cycle even when the instantaneous bus voltage is substantially identical to the desired bus voltage. In this manner at least one switch changes state with every clock cycle even in the presence of a constant (steady state) bus current draw. This somewhat random switching results in a nonuniform ripple voltage and in typically increased power consumption.

In addition, in certain applications the regulators of Fleck may need to be combined in parallel to accommodate increased bus current variation. However, in such a parallel connection the nominal bus voltage about which regulation occurs becomes a function of the bus current in a manner substantially similar to that shown in FIG. 1b. That is, control of the bus voltage is transferred between the parallel connected regulators in response to changes in current drawn by the bus. Such an interdependence between the nominal bus voltage about which control occurs and the instantaneous bus current limits voltage regulation capability.

Hence, a need in the art exists for a digital switching voltage regulator for providing regulation about a single voltage despite variations in the current supplied thereby.

SUMMARY OF THE INVENTION

The need in the art is addressed by the digital switching voltage regulator of the present invention. The regulator of the present invention includes a first voltage regulation module for regulating, within a first voltage regulation window defined by first upper and lower threshold voltages, the voltage across a load operatively coupled to the regulator. The regulator of the present invention further includes a second voltage regulation module for regulating the voltage across the load within a second voltage regulation window defined by second upper and lower threshold voltages. The second voltage regulation window is included within the first voltage regulation window and, in a preferred embodiment, the first and second regulation windows are centered about a common load voltage.

DETAILED DESCRIPTION OF THE INVENTION

Figure 2:
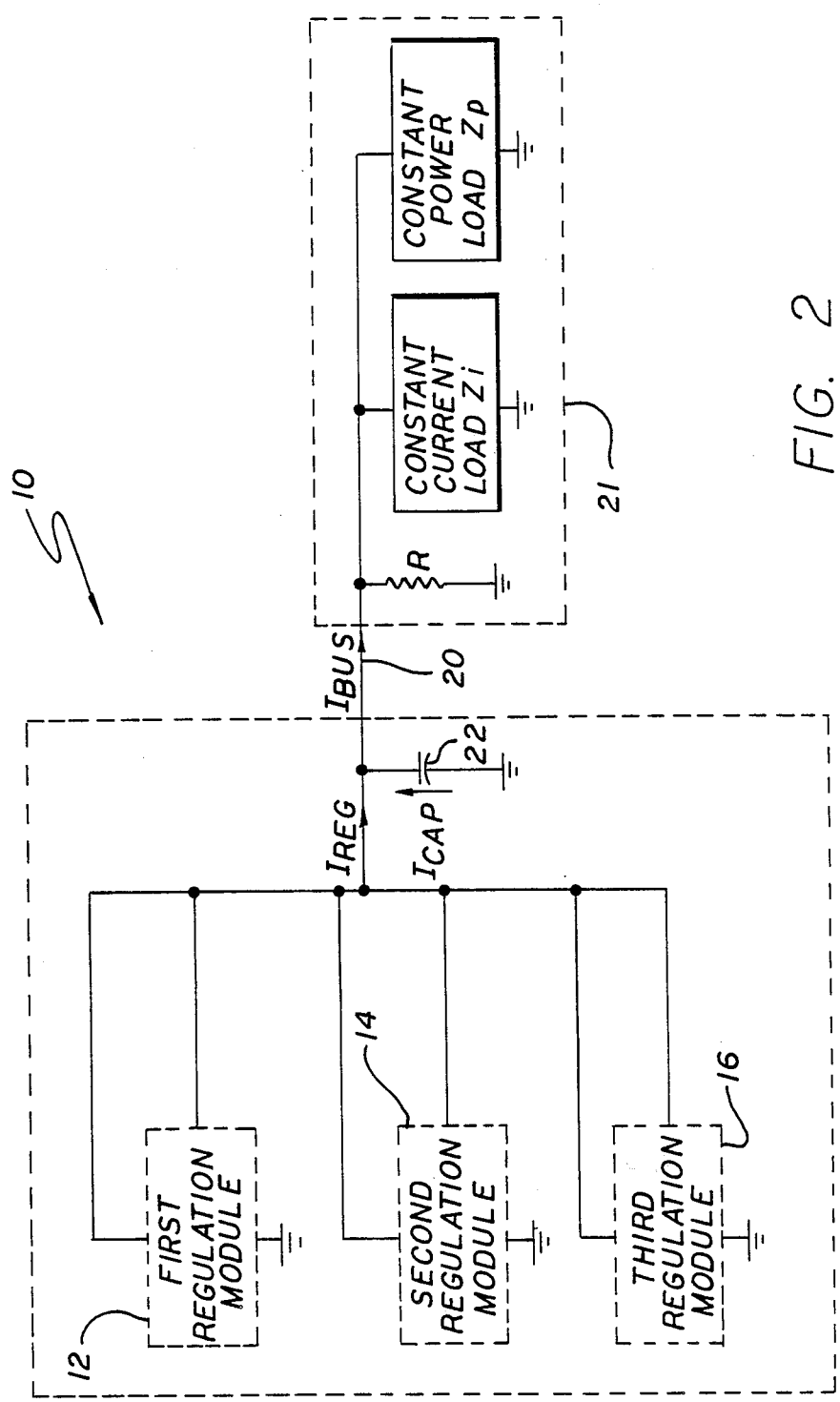
FIG. 2 is a block diagram representation of a preferred embodiment of the digital switching voltage regulator of the present invention.

FIG. 2 shows a block diagram representation of a preferred embodiment of the digital switching voltage regulator 10 of the present invention. The regulator 10 includes first, second and third regulation modules 12, 14 and 16 connected in parallel to a bus (signal line) 20. The regulator 10 is operative to maintain a substantially constant voltage on a bus (signal line) 20 in response to changes in the current $I_{bus}$ drawn by a bus load 21 connected thereto. In particular, a capacitor 22 within the regulator 10 compensates for immediate changes in $I_{bus}$ by absorbing or supplying a current $I_{cap}$. The capacitor current $I_{cap}$ induces a change in the charge stored on the capacitor 22 and hence leads to a corresponding change in the voltage on the bus 20. The regulator 10 of the present invention senses variations in the voltage on the bus 20 and adjusts the regulator current $I_{reg}$ to the load 21 and capacitor 22 accordingly. In this manner the voltage across the capacitor 22, and therefore on the bus 20, is held relatively constant notwithstanding variations in $I_{bus}$.

The regulation modules 12, 14 and 16 are each operative to regulate the voltage on the bus 20 for a particular range of bus current $I_{bus}$. However in contrast to conventional digital regulators, in the embodiment of FIG. 2 each of the modules 12, 14 and 16 provide regulation about a common nominal bus voltage. It is therefore a feature of the present invention that the voltage on the bus 20 is regulated about a single bus voltage independent of the bus current $I_{bus}$.

Figure 3:
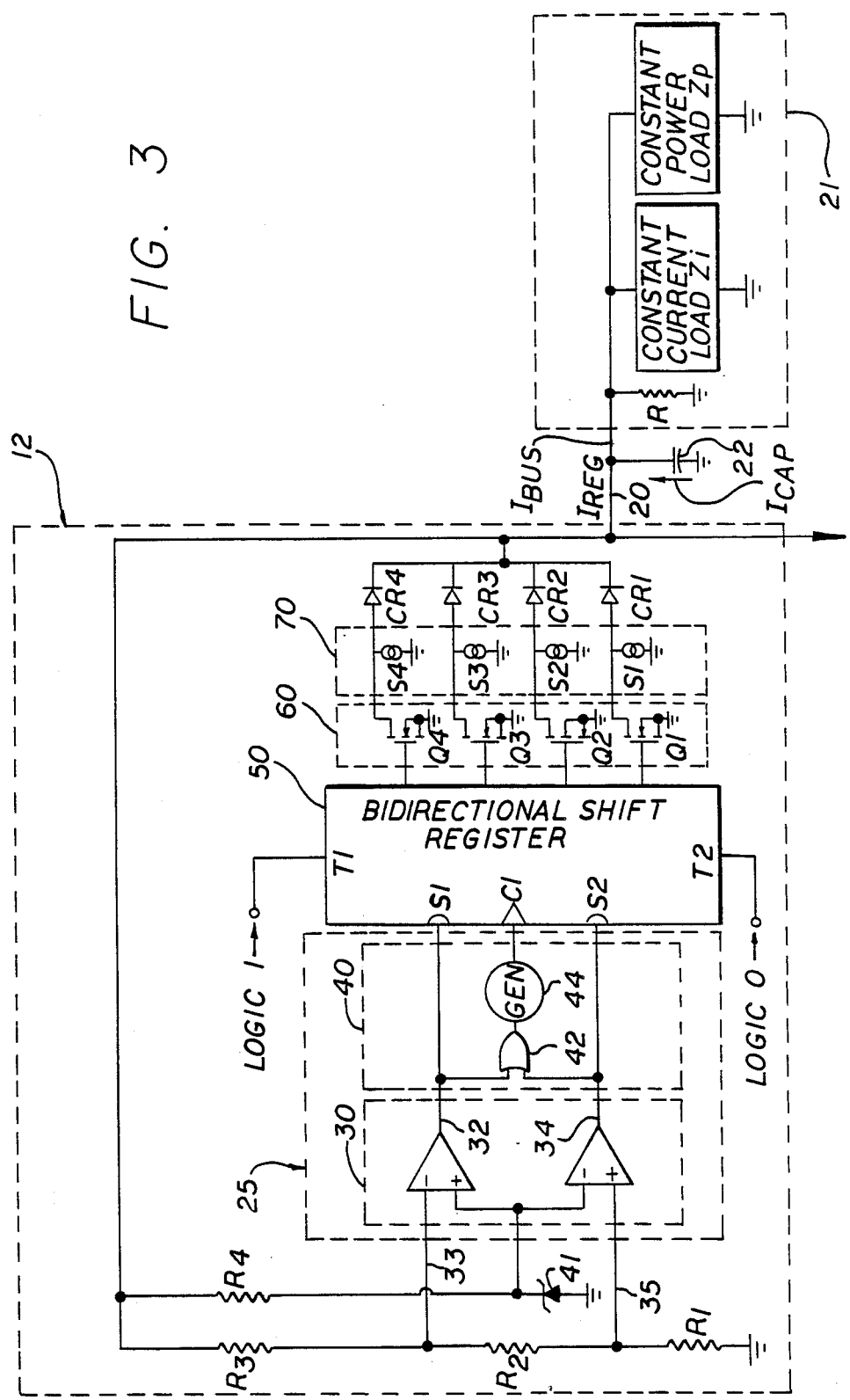
FIG. 3 is an illustrative representation of the first voltage regulation module included within the regulator of the present invention.

Although the present invention will be described in more detail below, the following brief description of the steady state operation of the first module 12 of the regulator 10 in response to a constant bus current Ibus is included to enhance understanding of the remainder of the specification. FIG. 3 shows an illustrative representation of a preferred embodiment of the first module 12. As shown in FIG. 3, the first module 12 of the present invention includes a control circuit 25 which is responsive to deviations in the voltage on the bus 20 from a first voltage regulation window. More specifically, the control circuit 25 includes a window comparator 30 and a controllable pulse generator 40. The comparator 30 compares a portion of the voltage on the bus 20 as sampled by resistors R1, R2 and R3 with a voltage generated by a voltage reference 41. When the difference between this bus voltage sample and the reference voltage exceeds a differential voltage the output voltage of the comparator 30 changes accordingly. Specifically, the comparator 30 raises voltage on the lines 32 and 34 to a logic 1 for bus voltages below and above, respectively, the first voltage regulation window.

When the voltage on the line 32 (34) is raised, a logic 1 (0) is transferred into a bi-directional shift register 50. Following this transfer, a shift pulse generated by the pulse generator 40 is applied to the register 50. Application of this pulse results in transistor switches within a switch array 60 being turned on or off in accordance with data stored in the register 50. When turned on, switches Q1, Q2, Q3 and Q4 shunt current from current sources S1, S2, S3 and S4 included within a current source array 70 away from the bus 20 and load 21. Thus, the current output of the first module 12 is varied in response to changes in the voltage on the bus 20. In this manner the first module 12 regulates the voltage on the bus 20 by adjusting the current $I_{reg}$ such that the voltage across the capacitor 22 remains relatively constant despite changes in $I_{bus}$.

The second and third regulation modules 14 and 16 of FIG. 2 are substantially similar to the first module 12 described above. The modules 12, 14 and 16 differ in the relative values assigned to the resistors R1, R2 and R3. The values of the resistors R1, R2, and R3 are chosen such that the second and third modules 14 and 16 span second and third regulation windows, each window being centered about a common bus voltage. In this manner the regulation windows of the modules 12, 14 and 16 are telescoped about a desired bus voltage. It is therefore understood that the following description of the first module 12 applies equally well to the second and third modules 14 and 16.

As shown in FIG. 3, the voltage reference 41 included within the first module 12 provides the comparator 30 with a reference voltage. The reference 41 may include a single voltage generating element or a plurality thereof. For example, with a nominal bus voltage of 30 ; V the reference 41 typically generates a 19.2 V reference voltage. The 19.2 V reference voltage is realized by a serial Connection of three 6.4 V temperature compensated reference Zener diodes. Diodes meeting the above requirements may be obtained from a manufacturer such as Motorola under the part number IN4596 A.

In the embodiment of FIG. 3 the voltage on the bus 20 is divided by the resistors R1, R2 and R3 and sampled by the comparator 30 via input lines 33 and 35. As the voltage dropped across R2 is equivalent to the voltage difference between the lines 33 and 35, the magnitude of the voltage drop across R2 defines the differential voltage applied to the comparator 30. The magnitude of this differential voltage is determined by the bus voltage and the value of R2 relative to R1 and R3. The value of resistor R1 is chosen such that this differential input voltage is centered at the voltage provided by the reference 41. Changes in the voltage of the bus 20 induce corresponding changes in the voltages on the lines 33 and 35 relative to the reference voltage. In this manner the resistors R1, R2 and R3 are chosen to allow the comparator 30 to sense changes in the bus voltage relative to the voltage generated by the reference 41.

The comparator 30 is utilized to signal departures in the bus voltage from the first regulation window of the first module 12. The first window is bounded by first upper and lower threshold voltages. In particular, the output voltage of the comparator 30 changes when the bus voltage departs from the first regulation window by crossing the first upper or lower threshold voltage thereof. Specifically, the comparator 30 raises the voltage on the line 32 or the voltage on the line 34 to a logic 1 when the voltage on the line 33 falls below, or the voltage on the line 35 rises above, respectively, the reference 41 by the differential threshold voltage of the comparator 30. In the embodiment of FIG. 3 this differential voltage is approximately 100 mV. As is implied above, the value of R2 relative to R1 and R3 determines the degree of bus voltage variation from the desired bus voltage (i.e. the span of the first regulation window) which will induce such a 100 mV comparator input voltage. Hence, the resistors R1, R2, and R3 determine the first upper and lower threshold voltages of a first voltage regulation window monitored by the comparator 30. The comparator 30 may be realized by a variety of commercially available integrated circuit (IC) window comparators. The LM139 comparator manufactured by Fairchild is an example of one such IC comparator.

The controllable pulse generator 40 is operative to pulse the bi-directional shift register 50 in response to actuation by the comparator 30. In particular, the controllable pulse generator 40 includes a conventional CMOS 4001B OR gate 42 and a clocked pulse generator 44. The OR gate 42 is coupled to the comparator 30 via the lines 32 and 34. The OR gate 42 provides an enable signal to the clocked generator 44 in response to the presence of a logic 1 on either of the lines 32 or 34. While being addressed by the enable signal from the gate 42 the clocked generator 44 supplies a series of pulses spaced equally in time to the shift register 50. Those skilled in the art will appreciate that the clocked pulsed generator 44 may be realized by an appropriate combination of a conventional RC oscillator with a comparator.

In the embodiment of FIG. 3, the bi-directional shift register 50 includes four serially arranged data registers (not shown) which allow control of switches Q1, Q2, Q3, and Q4 included within the switch array 60. The shift register 50 is coupled to the lines 32 and 34 at input ports S1 and S2, respectively. As mentioned above, data is shifted between the registers included within the shift register 50 in response to the voltage on the line 32 or the voltage on the line 34 being raised to a logic 1. More specifically, as the voltage on the bus 20 increases beyond the bounds of the first bus voltage regulation window the voltage on the line 34 will be raised and data will be shifted in the register 50 towards terminal T2. Concurrent with this data shift, a logic 1 will be loaded into the register 50 at terminal T1. Similarly, bus voltage decreases of sufficient magnitude relative to a desired bus voltage trigger the comparator to raise the voltage on the line 32 and thereby induce data within the register 50 to be serially shifted towards the terminal T1. Further, a logic 0 is loaded into the register 50 at the terminal T2 as data is shifted toward terminal T1. Hence, data is shifted within the register 50 in response to bus voltage fluctuations which exceed the first voltage regulation window. Various commercially available 4 bit bi-directional shift registers such as the CD40194 manufactured by National Semiconductor may be utilized to serve as the register 50.

As shown in FIG. 3, the register 50 may also be addressed by the controllable pulse generator 40 via input port C1. Pulses received by the register 50 at the port C1 enable the switches Q1, Q2, Q3 and Q4 to access data stored within the register 50. As mentioned above, the pulse generator 40 provides a pulse to the register 50 in response to either of the lines 32 or 34 being raised to a logic 1. In this manner the switch register 50 allows the switches Q1, Q2, Q3 and Q4 to have access to data stored therein, and hence to potentially change state, only after the voltage on the line 32 or 34 has been raised. The net effect is that the register 50 allows the switches Q1, Q2, Q3 and Q4 to turn on or off only after the voltage on the bus 20 has departed from the first bus voltage regulation window defined by the comparator 30. This selective control of the switch array 60 is in marked contrast to the system developed by Fleck mentioned in the Background of the Invention wherein a pulse train is continuously applied to a shift register irrespective of the instantaneous bus voltage. This causes at least one switch connected to the shift register to change state with every pulse, thereby generating a nonperiodic bus ripple voltage of potentially increased magnitude.

The switches Q1, Q2, Q3 and Q4 included within the switch array 60 are controlled by the shift register 50 and fed by power supplies S1, S2, S3 and S4, respectively. In the embodiment of FIG. 3 the switches Q1, Q2, Q3 and Q4 are field effect transistors (FETs). Commercially available FETs such as the IRF 150 FET (40 amp, 100 volt) manufactured by International Rectifier or similarly performing bipolar transistors afford adequate current handling capability. As may be evident upon inspection of FIG. 3, each of the switches Q1, Q2, Q3 and Q4 is controlled by one of the four data registers included within the shift register 50. That is, the presence of a logic 1 (0) within a particular data register induces the switch within the array 60 coupled thereto to be turned on (off). In this manner current from the power supplies S1, S2, S3 and S4 is either shunted to ground by the switches Q1, Q2, Q3 and Q4 or fed to the load 21 in response to data stored within the register 50.

As shown in FIG. 3 the power supplies S1, S2, S3 and S4 included within the array 70 are connected to the load 21 through the diodes CR1, CR2, CR3 and CR4. The power supplies S1, S2, S3 and S4 may be realized by power sources disposed to provide a constant current. The number of power supplies in the array 70 furnishing $I_{reg}$ at any instant is determined by the number of switches in the switch array 60 turned off. Hence, the power supply array 70 provides a controllable source of current for the load 21 and bus 20.

The diodes CR1, CR2, CR3 and CR4 prevent the voltage across the switches Q1, Q2, Q3 and Q4 from being impressed upon the load 21 while the switches Q1, Q2, Q3 and Q4 are conducting current. That is, while one of the switches within the array 60 is shunting current from one of the supplies within the array 70, the diode CR1, CR2, CR3 or CR4 connected to the particular switch and supply drops substantially all of the voltage present across the load 21. Conversely, while the load 21 and bus 20 are being provided current by one of the supplies S1, S2, S3 or S4, the voltage drop across the CR1, CR2, CR3 or CR4 coupled to this supply is approximately 0.7 volts. In this manner the diodes CR1, CR2, CR3 and CR4 buffer the load 21 from the switch array 60 and power supply array 70.

The load 21 includes a resistive load R, a constant current load $Z_i$ and a constant power load $Z_p$. The loads R, $Z_i$ and $Z_p$ model the three types of loads likely to be connected to the bus 20. The loads R, $Z_i$ and $Z_p$ each behave differently with respect to changes in the voltage on the bus 20. For example, a decrease in bus voltage induces a decrease in the current drawn by the load R, does not affect the current drawn by the load $Z_i$, and causes an increase in the current drawn by the load $Z_p$. The bus current $I_{bus}$ may be altered by the electrical connection or disconnection to the bus 20 of devices having any of the three loading characteristics described above. Although the timing diagrams discussed below are described with reference to changes in the current drawn by the load $Z_i$, it is understood the regulator 1? of the present invention is disposed to regulate the voltage on the bus 20 equally well with respect to changes in the resistance of the load R or in the power consumption of the load $Z_p$.

Figure 4:
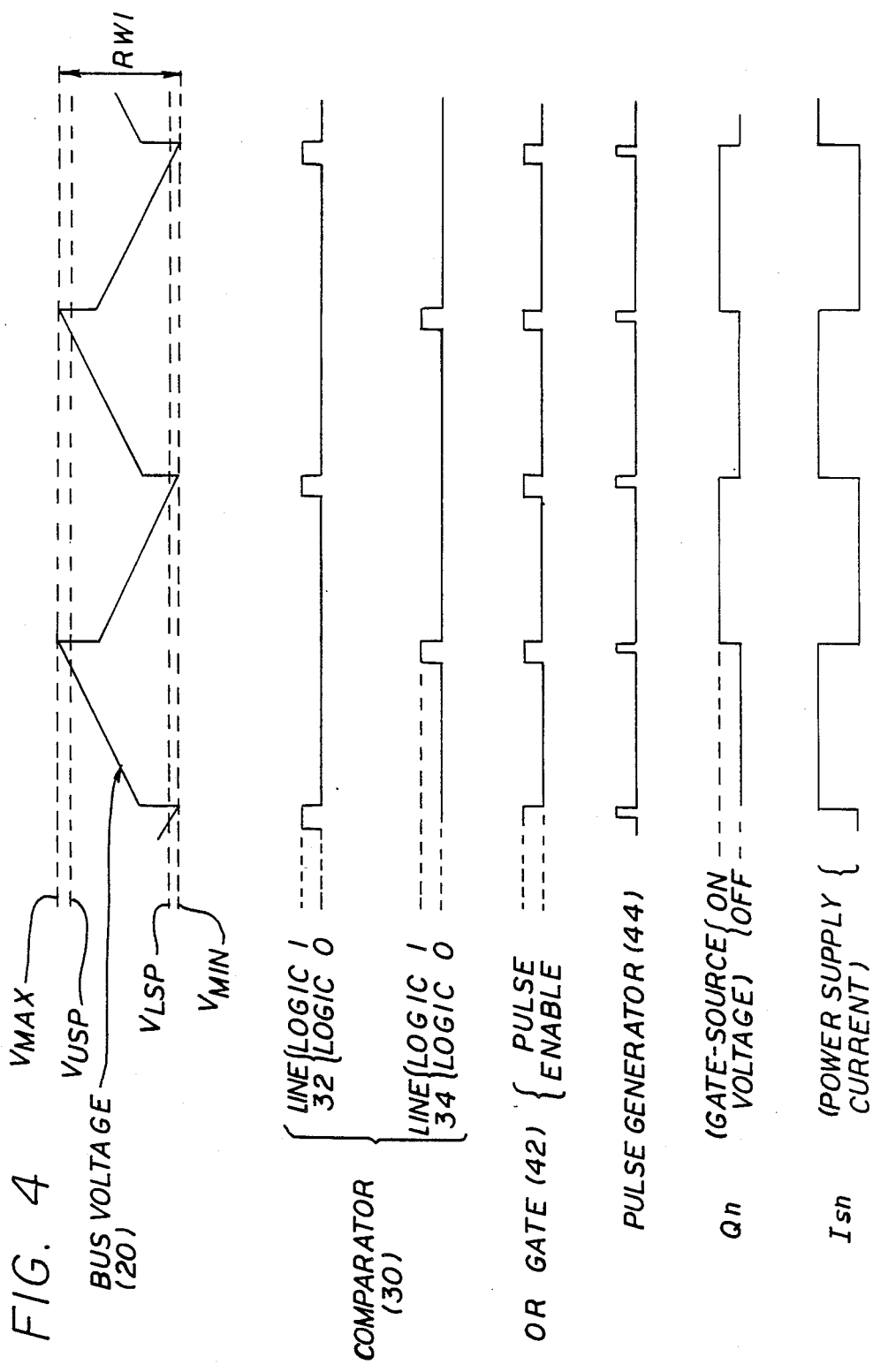
FIG. 4 is a which shows the bus voltage provided by the first voltage regulation module of the regulator of the present invention in response to a constant bus current $I_{bus}$.

FIG. 4 is a timing diagram which shows the steady state response of the module 12 to a constant bus current load. As shown in FIG. 4, the voltage on the bus 20 varies periodically within the first bus voltage window RW1 defined by upper and lower threshold voltages $V_{max}$ and $V_{min}$. The voltages $V_{usp}$ and $V_{lsp}$ are the bus voltages at which the comparator 30 is triggered to raise the voltage on the lines 32 and 34 to a logic 1, respectively. As discussed above, the voltages $V_{usp}$ and $V_{lsp}$ can be adjusted with the resistors R1, R2 and R3.

While the module 12 is operating in the steady state, three of the four switches Q1, Q2, Q3 and Q4 will typically remain on or off until a change occurs in $I_{bus}$. The number of switches in the switch array 60 turned on or off in the steady state depends in the steady state value of the desired, preselected voltage on the bus 20 and on the particular steady state current $I_{bus}$. For relatively larger (smaller) steady state bus currents $I_{bus}$, the array 60 will include proportionately more switches turned permanently off (on) pending a change in $I_{bus}$. Further, the remaining fourth switch in the array 60 (denoted by Qn in FIG. 4) will turn on and off as the bus voltage reaches $V_{max}$ and $V_{min}$, respectively. The maximum frequency of the steady state ripple voltage on the bus 20, and therefore one half of the maximum switching frequency of Qn, is given by the expression:

$$f_{max} = 1/(2*(C*(V_{max}-V_{min})-Isn*Resr)/(Isn/2)) \quad [1]$$

where, $f_{max}$ = maximum ripple voltage frequency

C = capacitance of the capacitor 22
$V_{max}$ = upper threshold of bus voltage window
$V_{min}$ = lower threshold of bus voltage window
Isn = current to the load 21 and capacitor 22 from supply (S1, S2, S3 or S4) coupled to Qn
Resr = equivalent series resistance of the capacitor 22.

As shown in FIG. 4, the OR gate 42 sends a pulse enable signal to the pulse generator 44 in response to either the voltage on the line 32 or the voltage on the line 34 being raised to a logic 1. Concurrent with the generation of the pulse enable signal data within the register 50 is serially shifted. The pulse generator 44 delivers a pulse to the shift register 50 approximately 5 microseconds after receiving the pulse enable signal. The 5 microsecond delay is built in to the pulse generator 44 to allow information within the register 50 to settle after being serially shifted. As is evident from FIG. 4, Qn changes state immediately after the register 50 is pulsed by the generator 44. Accordingly, the current Isn to the load 21 from the supply coupled to Qn either turns on or off depending on the state change of Qn. In short, while in the steady state, the module 12 supplies current to the load 21 until the voltage on the bus approaches $V_{max}$. This current is then reduced by turning on Qn which induces the capacitor 22 discharge into the load 21. Consequently, voltage on the bus drops to near $V_{min}$. Current is then again increased to the load 21 by turning off Qn. In this manner Qn is switched at a rate necessary to constrain the bus voltage to remain within $V_{max}$ and $V_{min}$, thereby providing a periodic and predictable bus ripple voltage.

Figure 5:
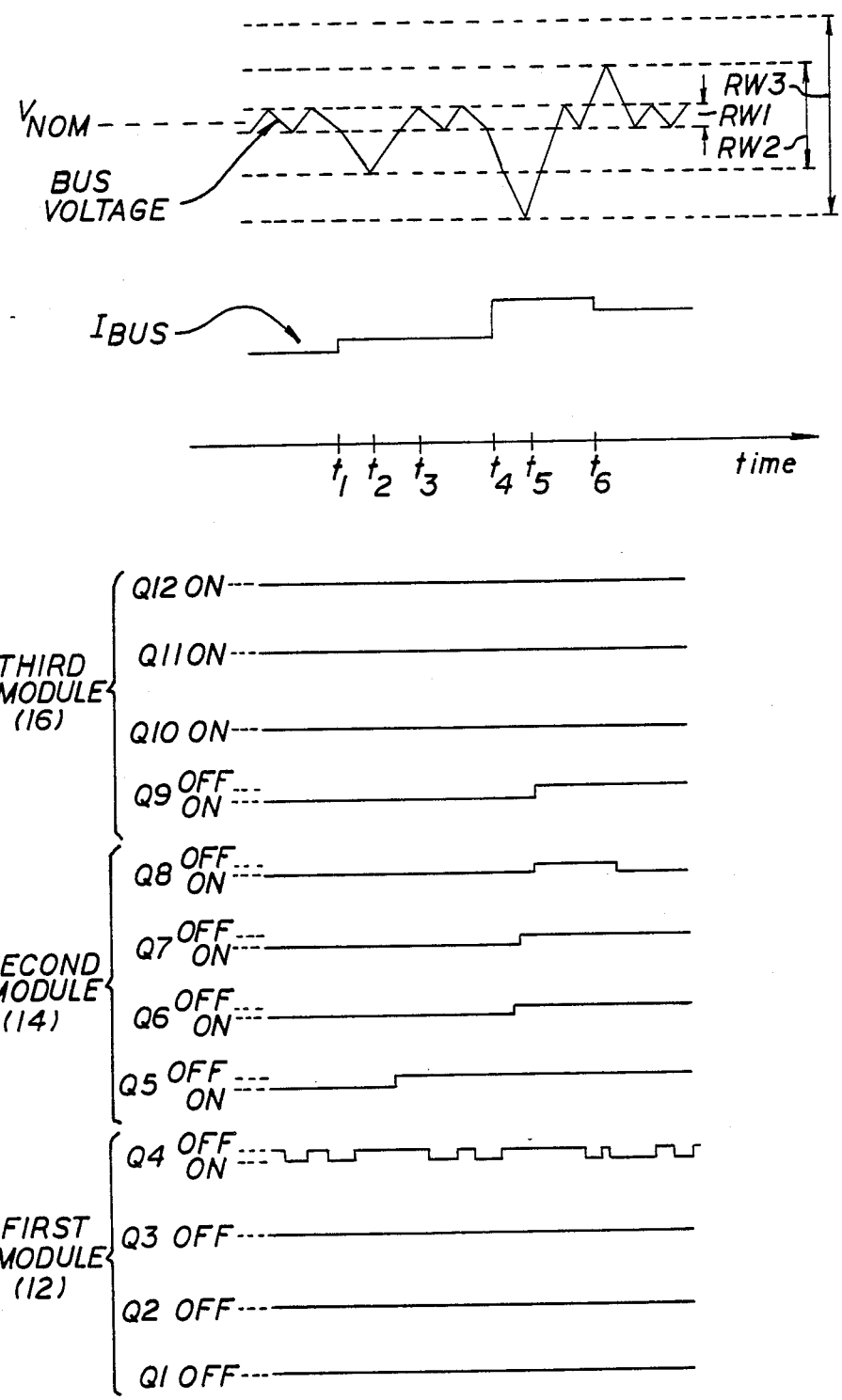
FIG. 5 is a timing diagram which shows the bus voltage provided by the regulator of the present invention in to step changes in $I_{bus}$.

FIG. 5 is a timing diagram for the regulator 10 of the present invention which illustrates a telescoped arrangement of regulation windows RW1, RW2, and RW3 of the modules 12, 14 and 16 about a nominal bus voltage $V_{nom}$. AS shown in FIG. 5, the bus voltage varies within the windows RW1, RW2 and RW3 in response to changes in the current through the load $Z_i$. The FET transistor switches Q5 through Q8 and Q9 through Q12 of the second and third modules 14 and 16 are substantially identical to the switches Q1 through Q4 of the first module 12 described above. In the timing diagram of FIG. 5 the drain to source voltages of the transistor switches Q1 through Q12 illustratively represented. Hence, when turned off switches are shown to have relatively higher drain to source voltages than when turned on.

As shown in FIG. 5, the initially constant bus current $I_{bus}$ results in the bus voltage rippling in the steady state within the regulation window RW1 associated with the first regulation module 12. This steady state operation is substantially identical to that of FIG. 4 described above. At time $t_1$ the bus current Ibus is increased due to an increase in the current drawn by $Z_i$. This increase in bus current is initially supplied by the capacitor 22 and hence a corresponding decrease occurs in the bus voltage. As the bus voltage drops below the lower bound of RW1 the switch Q4 is turned off which allows current from S4 to flow to the bus 20 and load 21. However, as the step increase in $I_{bus}$ at time $t_1$ was greater than the current from S4 the bus voltage continues to drop until time $t_2$ At time $t_2$ the bus voltage intersects the lower bound of the window RW2 which triggers the switch Q5 within the second module 14 to turn off. This allows the module 14 to supply the additional current $I_{reg}$ necessary to accommodate the step increase in $I_{bus}$ at $t_1$ while charging the capacitor 22. In this manner the bus voltage is returned to within the window RW1.

At time $t_3$ the bus voltage intersects the upper bound of the window RW1 which causes the switch Q4 to turn on and thereby decrease Ireg Switch Q5 remains turned off as the bus voltage has not intersected the upper bound of the window RW2. The bus voltage then ripples in the steady state until time $t_4$ at which time the bus current $I_{bus}$ experiences a second step increase due to an increase in the current drawn by $Z_i$. Again, the switch Q4; is turned off as the bus voltage drops below the lower bound of the window RW1. Further, the step increase in $I_{bus}$ at $t_4$ is of sufficient magnitude that the switches Q5 through Q8 are sequentially turned off as the voltage drops below RW2. Upon intersection of the bus voltage with the lower bound of the window RW3 switch Q9 is turned off. This results in the modules 12, 14 and 16 supplying sufficient current to the bus 20 and load 21 to satisfy the step increase in $I_{bus}$ at $t_4$ while concurrently increasing the bus voltage by charging the capacitor 22.

The bus voltage increases after $t_5$ until intersection with the upper bound of the window RW1 at which point steady state operation commences until time $t_6$. At time $t_6$ a step decrease occurs in the bus current $I_{bus}$ which results in an increase in the bus voltage to the upper bound of the window RW2. As the window RW2 is defined by the second module 14, switch Q8 is turned on upon intersection of the bus voltage with the upper bound of the window RW2. This decreases the current supplied by the regulator 10 to the load 21 thereby allowing the bus voltage to return to steady state fluctuation within the window RW1.

Figure 1A:
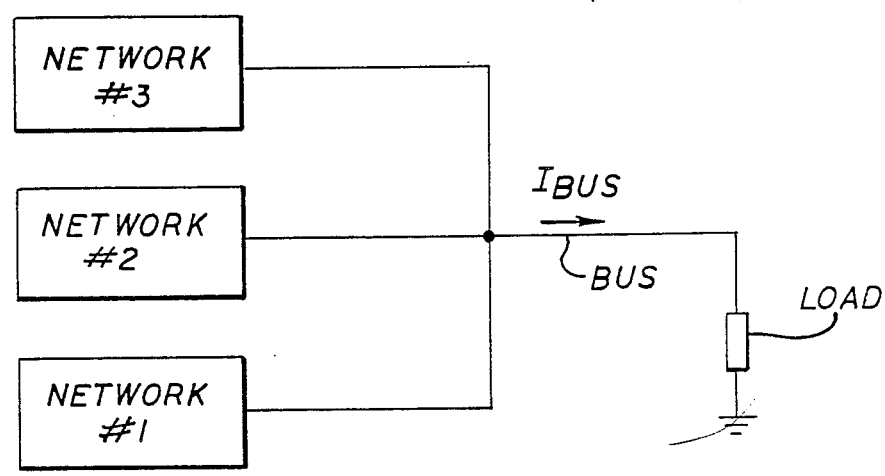
Fig. 1a block diagram representation of a conventional digital switching voltage regulator having a first, a second and a third parallel connected networks.
Figure 1B:
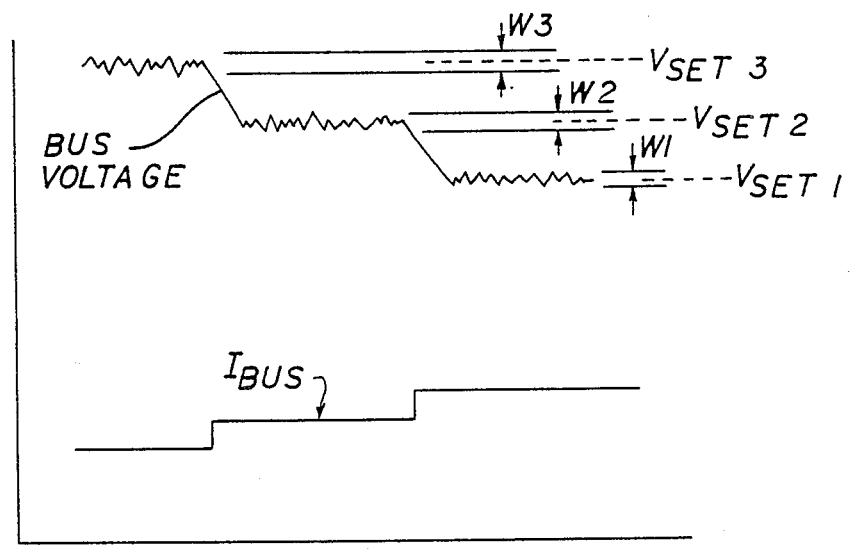
FIG. 1b is a graphical representation of the regulated bus voltage provided by the conventional regulator of FIG. 1a in response to a bus current Ibus.

As is evident upon inspection of FIG. 5, the present invention includes the feature that the nominal bus voltage $V_{nom}$ about which regulation occurs is independent of the magnitude of the bus current $I_{bus}$. This independence is in marked contrast to the interdependence between bus voltage and bus current common in conventional digital switching regulators such as that of FIG. 1. Hence, the capability of the regulator 10 of the present invention to effect, independent of the magnitude of $I_{bus}$, steady state regulation of the bus voltage about lo the voltage $V_{nom}$ and within the window RW1 allows for substantially improved voltage regulation.

Thus the present invention has been described with reference to particular embodiments in connection with a particular application. Those having ordinary skill in the art and access to the teachings of the present invention will recognize additional modifications and applications within the scope thereof. For example, alternative embodiments of the present invention may employ more than three voltage regulation modules for increased dynamic range. Moreover, the control circuits included within the regulation modules may utilize controllable pulse generators having circuitry other than that described above for selectively pulsing the shift registers. Similarly, the invention is not limited to the particular embodiments of the window comparators or switch arrays disclosed herein. Those skilled in the art may be aware of other circuits for sensing deviations in the bus voltage from a preselected voltage regulation window which may be suitable for inclusion in alternative embodiments of the present invention. Additionally, the telescoped voltage regulation windows may be arranged asymetrically with respect to the nominal bus voltage without departing from the scope of the present invention. Finally, those skilled in the art will appreciate that a small AC signal may be introduced to the circuit of the invention to ensure that the regulated bus voltage will not "hang up" between windows at some load current.

It is therefore contemplated by the appended claims to cover any and all such modifications.

Accordingly,

What is claimed is:

1. A digital switching voltage regulator comprising:
   first voltage regulation module means for regulating, within a first voltage regulation window defined by first upper and lower threshold voltages, the voltage across a load operatively coupled to said regulator in response to a first current level drawn by said load and
   second voltage regulation module means for regulating said load voltage within a second voltage regulation window in response to a second current level drawn by said load, said second window being centered within said first window about a common load voltage and being defined by second upper and lower threshold voltages, said second upper threshold voltage being lower than said first upper threshold voltage and said second lower threshold voltage being higher than said first lower threshold voltage.

2. The voltage regulator of claim 1 wherein said first voltage regulation module means includes:
   first control circuit means for providing a first output voltage and at least one first shift pulse when the voltage across said load departs from a range defined by said first voltage regulation window by crossing said first upper threshold voltage and for providing a second output voltage and at least one second shift pulse when the voltage across said load departs from said first voltage regulation window by crossing said first lower threshold voltage;
   first bi-directional shift register means for generating a first set of control voltages in response to said first output voltage and said first shift pulse and for generating a second set of control voltages in response to said second output voltage and said second shift pulse; and
   first switchable current source means for providing a first current to said load in response to said first set of control voltages and a second current to said load in response to said second set of control voltages.

3. The voltage regulator of claim 2 wherein said second voltage regulation module means includes:
   second control circuit means for providing a first output voltage and at least one first shift pulse when the voltage across said load departs from said second voltage regulation window by crossing said second upper threshold voltage and for providing a second output voltage and at least one second shift pulse when the voltage across said load departs from said second voltage regulation window by crossing said second lower threshold voltage;
   second bi-directional shift register means for generating a first set of control voltages in response to said first output voltage of said second control circuit means and said first shift pulse and for generating a second set of control voltages in response to said second output voltage of said second control circuit means and said second shift pulse; and
   second switchable current source means for providing a first current to saids load in response to said first set of control voltages generated by said second bi-directional shift register means and for providing a second current to said load in response to said second set of control voltages generated by said second bi-directional shift register means.

4. The regulator of claim 2 wherein said first switchable current source means includes:
an array of current sources for generating said first and second currents and
an array of switches respectively coupled to said current sources for intermittently shunting at least a portion of said first current away from said load in response to said first set of control voltages and for intermittently shunting at least a portion of said second current away from said load in response to said second set of control voltages.

5. The regulator of claim 2 said first control circuit means further includes:
means for providing a reference voltage and
window comparator means for providing said first output voltage when a first portion of the voltage across said load is greater than said reference voltage by a differential voltage proportional to said first voltage regulation window and for providing said second output voltage when a second portion of the voltage across said load is less than said reference voltage by said differential voltage.

6. The regulator of claim 2 wherein said first control circuit means further includes controllable pulse generator means operatively coupled to said window comparator means for producing said shift pulse.

7. The switching regulator of claim 6 wherein said controllable pulse generator means includes an OR gate for providing a pulse enable signal in response to said first or said second output voltages and a clocked pulse generator for generating a series of said shift pulses while being addressed by said enable signal.

8. The switching regulator of claim 7 wherein said first bi-directional shift register means includes a plurality of serially arranged data registers for storing said first set of control voltages.

9. The switching regulator of claim 8 wherein each switch included within said array of switches is operatively coupled to one of said data registers.

10. The switching regulator of claim 9 wherein said bi-directional shift register means further includes means for serially shifting data within said registers in first and second directions in response to said first and second output voltages, respectively.

11. An improved digital switching voltage regulator comprising:
means for providing first and second reference voltages;
first window comparator means for providing a first output voltage when a first portion of the voltage across a load coupled to said regulator is greater than said first reference voltage by a first differential voltage and for providing a second output voltage when a second portion of the voltage across said load is less than said first reference voltage by said first differential voltage;
second window comparator means for providing a third output voltage when a third portion of the voltage across said load is greater than said second reference voltage by a second differential voltage and for providing a fourth output voltage when a fourth portion of the voltage across said load is less than said second reference voltage by said second differential voltage;
a first OR gate coupled to said first window comparator means for producing a first pulse enable signal in response to said first or second output voltage of said first window comparator means;
a second OR gate coupled to said second window comparator means for producing a second pulse enable signal in response to said third or fourth output voltage of said second window comparator means;
a first clocked pulse generator coupled to said first OR gate for generating a first series of shift pulses while being addressed by said first enable signal;
a second clocked pulse generator coupled to said second OR gate for generating a second series of shift pulses while being addressed by said second enable signal;
first bi-directional shift register means for generating a first set of control voltages in response to said output voltage of said first window comparator means and one of said first series of shift pulses;
second bi-directional shift register means for generating a second set of control voltages in response to said output voltage of said second window comparator means and one of said second series of shift pulses;
a first array of current sources for providing a first current to said load;
a second array of current sources for providing a second current to said load;
a first array of switches respectively coupled to said first array of current sources for intermittently shunting at least a portion of said first current away from said load in response to said first set of control voltages; and
a second array of switches respectively coupled to said second array of current sources for intermittently shunting at least a portion of said second current away from said load in response to said second set of control voltages.

12. A digital switching voltage regulator comprising:
first voltage regulation module means for regulating, within a first voltage regulation window defined by first upper and lower threshold voltages, the voltage across a load operatively coupled to said regulator, said first voltage regulation module means including:
first control circuit means for providing a first output voltage and at least one first shift pulse when the voltage across said load departs from a range defined by said first voltage regulation window by crossing said first upper threshold voltage and for providing a second output voltage and at least one second shift pulse when the voltage across said load departs from said first voltage regulation window by crossing said first lower threshold voltage, said first control circuit means including controllable pulse generator means operatively coupled to said window comparator means for producing said shift pulse, said controllable pulse generator means including an OR gate for providing a pulse enable signal in response to said first or said second output voltages and a clocked pulse generator for generating a series of said shift pulses while being addressed by said enable signal first bidirectional shift register means for generating a first set of control voltages in response to said first output voltage and said first shift pulse and for generating a second set of control voltages in response to said second output voltage and said second shift pulse and first switchable current source means for providing a first current to said load in response to said first set of control voltages and a second current to said load in response to said second set of control voltages and second voltage regulation module means for regulating said load voltage within a second voltage regulation window, said second window being included within said first window and being defined by second upper and lower threshold voltages.

13. The switching regulator of claim 12 wherein said first bidirectional shift register means includes a plurality of serially arranged data registers for storing said first set of control voltages.

14. The switching regulator of claim 13 wherein each switch included within said array of switches is operatively coupled to one of said data registers.

15. The switching regulator of claim 14 wherein said first bidirectional shift register means further includes means for serially shifting data within said registers in first and second directions in response to said first and second output voltages, respectively.

16. A method of regulating the voltage across a load comprising the steps of:
   (a) regulating, within a first voltage regulation window defined by first upper and lower threshold voltages, the voltage across a load in response to a first current level drawn by said load and
   (b) regulating said load voltage within a second voltage regulation window in response to a second current level drawn by said load, said second window being centered within said first window about a common load voltage and being defined by second upper and lower threshold voltages, said second upper threshold voltage being lower than said first upper threshold voltage and said second lower threshold voltage being higher than said first lower threshold voltage.

* * * * *